(12) United States Patent
Curtis et al.

(10) Patent No.: US 8,896,456 B2
(45) Date of Patent: Nov. 25, 2014

(54) SEAT LOCATION SYSTEM

(71) Applicant: The Boeing Company, Chicago, IL (US)

(72) Inventors: Vicki Ann Curtis, Stanwood, WA (US); Kayla Dunn, Cincinnati, OH (US); Ricardo Elizondo Costa, San Luis Potosi (MX); Sophie Prescott, Walnut Creek, CA (US); Colin Cansler Curry, Plano, TX (US); Sooshin Choi, Cincinnati, OH (US); Lingyu Zhu, Cincinnati, OH (US)

(73) Assignee: The Boeing Company, Chicago, IL (US)

( * ) Notice: Subject to any disclaimer, the term of this patent is extended or adjusted under 35 U.S.C. 154(b) by 36 days.

(21) Appl. No.: 13/793,151

(22) Filed: Mar. 11, 2013

(65) Prior Publication Data

US 2014/0253335 A1 Sep. 11, 2014

(51) Int. Cl.
*G08B 21/00* (2006.01)
*G08B 5/00* (2006.01)

(52) U.S. Cl.
CPC ........................................ *G08B 5/00* (2013.01)
USPC ...................... 340/667; 340/691.6; 340/815.4

(58) Field of Classification Search
USPC ................ 340/666, 667, 691.1, 691.4, 691.6, 340/815.4, 815.45, 945
See application file for complete search history.

(56) References Cited

U.S. PATENT DOCUMENTS

| | | | |
|---|---|---|---|
| 6,140,921 A * | 10/2000 | Baron et al. ................... | 340/540 |
| 6,578,795 B2 * | 6/2003 | Romca et al. ............. | 244/122 R |
| 7,178,954 B2 | 2/2007 | Blechschmidt | |
| 7,204,622 B2 * | 4/2007 | Dowling et al. .............. | 362/471 |
| 2007/0001124 A1 * | 1/2007 | Moreno Sobrino et al. .......................... | 250/484.4 |
| 2009/0112407 A1 * | 4/2009 | Kneller et al. .................. | 701/45 |

FOREIGN PATENT DOCUMENTS

EP 1493662 B1 7/2008

* cited by examiner

*Primary Examiner* — Thomas Mullen
(74) *Attorney, Agent, or Firm* — Yee & Associates, P.C.

(57) ABSTRACT

A method and apparatus for indicating a seat location. An indicator is activated for a seat in a passenger cabin when a passenger leaves the seat. The indicator indicates a location of the seat when activated.

16 Claims, 8 Drawing Sheets

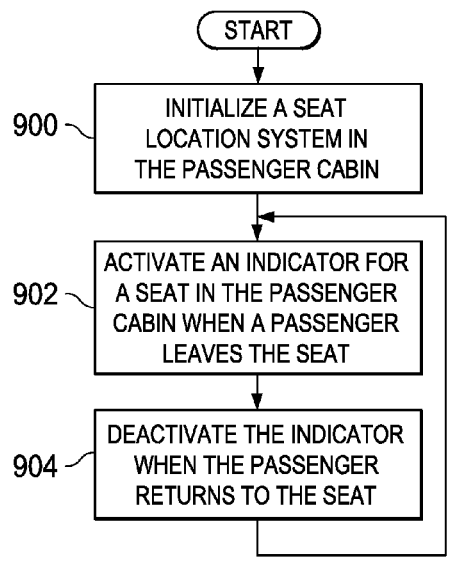
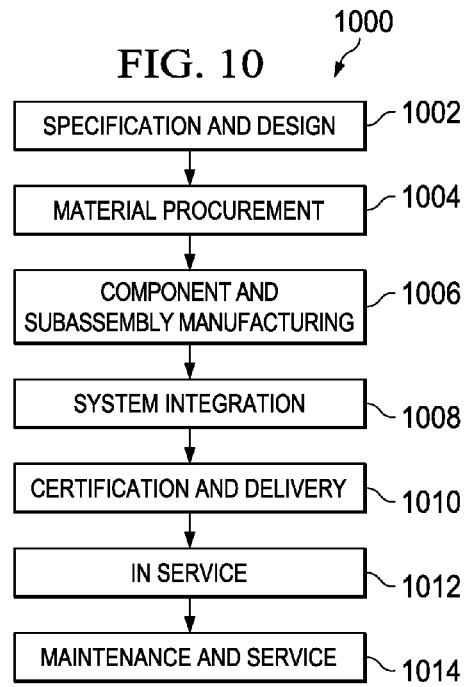
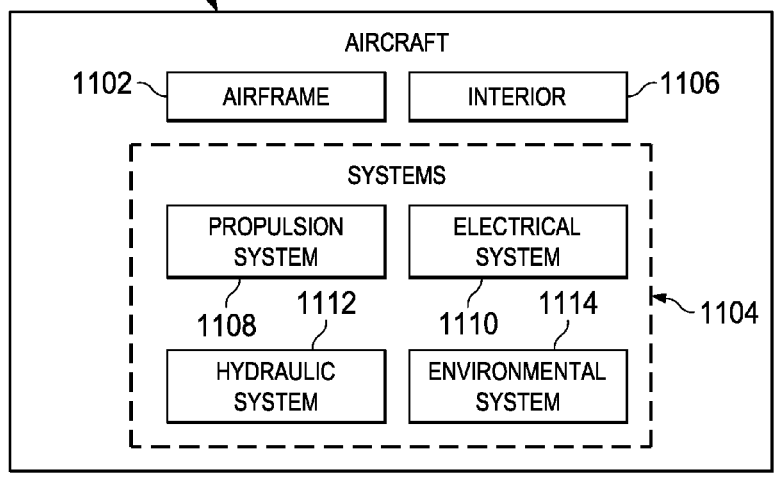

SEAT LOCATION SYSTEM

BACKGROUND INFORMATION

1. Field

The present disclosure relates generally to aircraft and, in particular, to passenger cabins in aircraft. Still more particularly, the present disclosure relates to a method and apparatus for indicating a seat in the passenger cabin of an aircraft.

2. Background

The passenger cabin of an aircraft has seats arranged in rows. These rows extend from one side of the aircraft to the other side. Additionally, one or more aisles also may extend along the length of the aircraft.

Passengers are assigned seats. During the flight of an aircraft, a passenger may leave a seat for various reasons. For example, a passenger may leave a seat to walk over and talk to a passenger in another seat. In other instances, a passenger may leave their seat to visit a lavatory. In other cases, a passenger may need to walk along aisles to stretch during a long flight.

When a passenger leaves a seat and returns to the seat, locating the seats may be more difficult than desired. If a passenger returns to an incorrect seat, sitting in an incorrect seat may be awkward if another passenger returns to the seat. Additionally, the embarrassment of appearing to be lost also may occur when seats are difficult to find and may be embarrassing for the passenger.

For example, a passenger may look at the row numbers. However, sometimes passengers do not remember the row numbers after being seated. Further, low lighting environments may be present during some portions of the flight. This low lighting environment may make it even more difficult to read labels for row numbers to find the correct seat.

In another example, a passenger may use landmarks to locate a seat. These landmarks may include, for example, the faces or other features of other passengers that are in their seats. This process, however, may be less useful, when the passenger sees the back of the heads of the passengers when returning to a seat.

Therefore, it would be desirable to have a method and apparatus that takes into account at least some of the issues discussed above, as well as other possible issues.

SUMMARY

An illustrative embodiment of the present disclosure provides an apparatus comprising an indicator and a controller. The indicator is configured to be positioned in a passenger cabin and generate an indication of a seat location for a seat when the indicator is activated. The controller is configured to activate the indicator.

Another illustrative embodiment comprises a seat location system. The seat location system comprises rows of seats in a platform cabin and indicators. The indicators are associated with the rows of the seats. An indicator in the indicators is configured to indicate a seat location for a seat in a row of the seats within the platform cabin when activated by a passenger leaving the seat.

Yet another illustrative embodiment provides a method for indicating a seat location. An indicator is activated for a seat in a passenger cabin when a passenger leaves the seat. The indicator indicates a location of the seat when activated.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 9 is an illustration of a flowchart of a process for indicating a seat location in accordance with an illustrative embodiment;

FIG. 10 is an illustration of an aircraft manufacturing and service method in accordance with an illustrative embodiment; and FIG. 11 is an illustration of an aircraft in the form of a block diagram in which an illustrative embodiment may be implemented.

DETAILED DESCRIPTION

The illustrative embodiments recognize and take into account one or more different considerations. For example, the illustrative embodiments recognize and take into account that convenience is often a significant factor for passengers. The level of convenience during the flight may affect the probability of the passenger returning to use the same airline at another time.

The following illustrative embodiments provide a method and apparatus for increasing the ability of a passenger to find a seat assigned to the passenger when returning to the seat.

Figure 1:
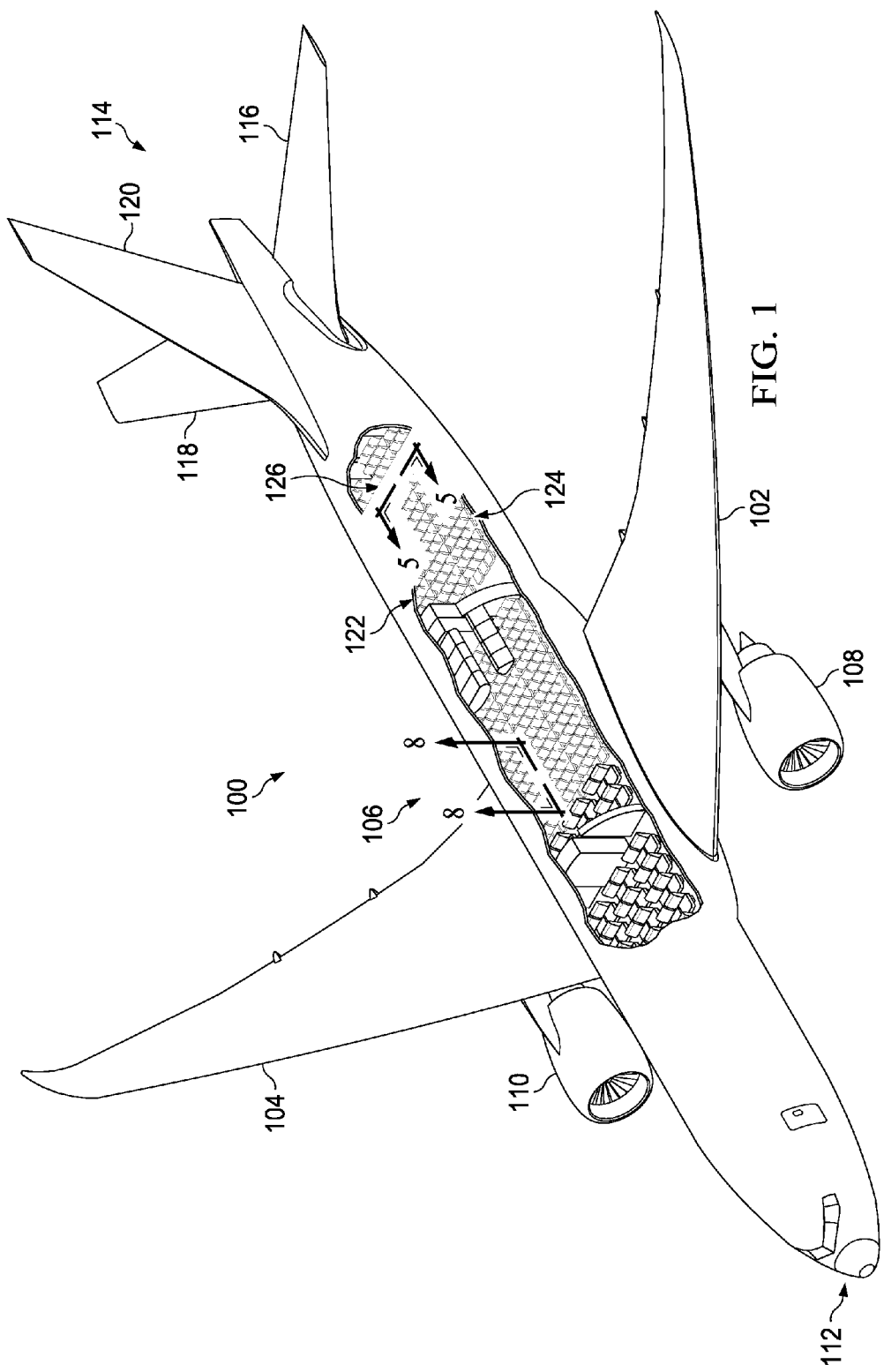
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has nose section 112 and tail section 114. Horizontal stabilizer 116, horizontal stabilizer 118, and vertical stabilizer 120 are attached to tail section 114 of body 106.

As can be seen in this illustrative example, passenger cabin 122 is located within body 106 of aircraft 100. Seats 124 are located within passenger cabin 122 in this exposed view of aircraft 100.

In these illustrative examples, seat location system 126 may be implemented within aircraft 100. In particular, seat location system 126 may be implemented within passenger cabin 122. Seat location system 126 may be used to provide an indication of seat locations for the passengers. The indication of seat locations may be provided to passengers when they are returning to the seats assigned to them.

Figure 2:
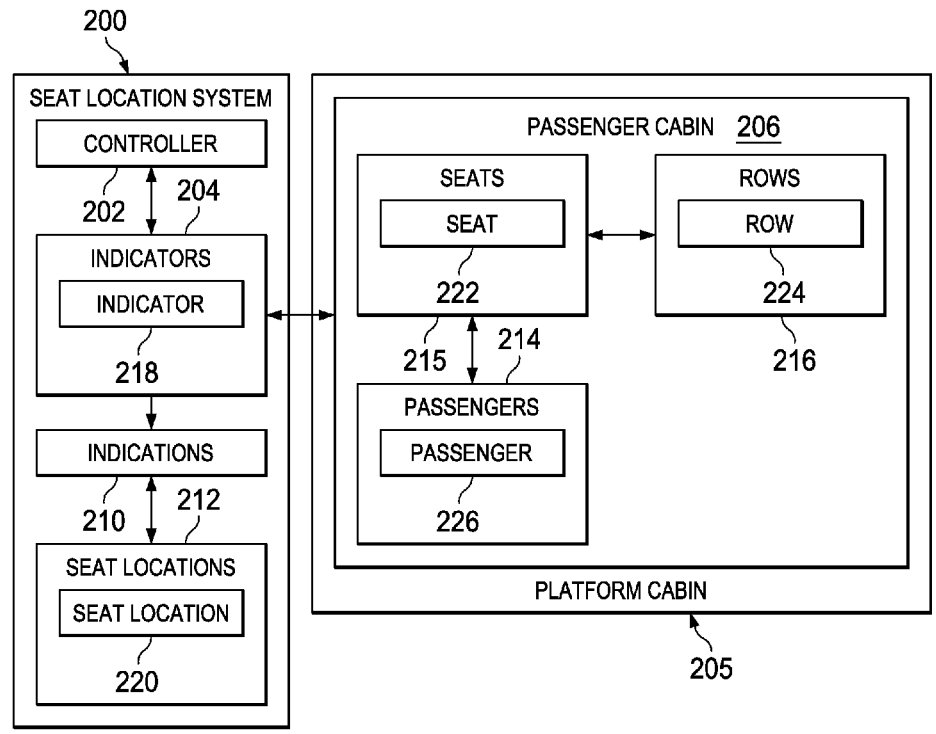
FIG. 2 is an illustration of a seat location system in the form of a block diagram in accordance with an illustrative embodiment.

With reference now to FIG. 2, an illustration of a seat location system in the form of a block diagram is depicted in accordance with an illustrative embodiment. Seat location system 200 is an example of seat location system 126 used in aircraft 100 in FIG. 1.

In the illustrative example, seat location system 200 includes a number of different components. As depicted, seat location system 200 includes controller 202 and indicators 204.

Indicators 204 are hardware devices in these illustrative examples. Indicators 204 are positioned within platform cabin 205. In this example, platform cabin 205 takes the form of passenger cabin 206. Indicators 204 are configured to visually generate indications 210 in the illustrative examples. The position of indicators 204 is such that indications 210 of seat locations 212 for passengers 214 may be generated by indicators 204.

In one illustrative example, seats 215 may be arranged in rows 216. Indicators 204 may be associated with rows 216 of seats 215.

When one component is "associated" with another component, the association is a physical association in the depicted examples. For example, a first component, indicators 204, may be considered to be associated with a second component, rows 216 of seats 215, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In one illustrative example, indicator 218 in indicators 204 is configured to indicate seat location 220 for seat 222 in seats 215 in row 224 in rows 216 within passenger cabin 206. Indicator 218 may provide this indication when activated by passenger 226 in passengers 214 leaving seat 222. The activation of indicator 218 may be performed automatically when passenger 226 leaves seat 222, by passenger 226, or some combination thereof.

Indicator 218 may take various forms. For example, indicator 218 may be selected from at least one of incandescent light, a light emitting diode, a light projector, a display screen, a digital sign, electronic paper, electronic ink, or other suitable types of devices.

As depicted, controller 202 is configured to control the activation and deactivation of indicators 204 to generate indications 210 for passengers 214 of seat locations 212 for passengers 214. Controller 202 may be hardware, software, firmware, or some combination thereof depending on a particular implementation. When software is used, the operations performed by seat location system 200 may be implemented in program code configured to run on a processor unit. When firmware is used, the operations performed by seat location system 200 may be implemented in program code and data and stored in persistent memory to run on a processor unit. When hardware is employed, the hardware may include circuits that operate to perform the operations in seat location system 200.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

As depicted, controller 202 may be comprised of at least one of a switch, a sensor system, a processor unit, a computer, an application integrated circuit, or other suitable components. For example, when controller 202 includes a switch, the switch may be one that is operable by a passenger, controlled by a circuit, controlled by a computer, or some other device. As another example, the sensor system may comprise pressure sensors that are associated with the seats. The pressure sensor may generate data used to determine when a passenger has left a seat. In other words, the pressure sensor may be used to detect when the passenger leaves the seat.

The complexity of controller 202 may depend on the particular implementation. For example, controller 202 may only include a switch activated by a passenger to activate an indicator in indicators 204. In other examples, controller 202 may include a computer system, switches, and sensors used to activate indicators 204.

The illustration of seat location system 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although seat location system 200 has been described with respect to a passenger cabin in an aircraft, seat location system 200 may be used in other types of vehicles that may have passenger cabins. For example, seat location system 200 may be used in the passenger cabin located in a vehicle selected from one of a surface ship, a spacecraft, a train, a bus, and other suitable types of vehicles. In yet other illustrative examples, seat location system 200 may be used in other platforms in which platform cabin 205 may take other forms than passenger cabin 206 for a vehicle, such as aircraft 100 in FIG. 1. For example, seat location system 200 may be implemented in platform cabin 205 for a platform selected from one of a mobile platform, a stationary platform, a land-based structure, an aquatic-based structure, and a space-based structure. More specifically, the platform may be a movie theater, an auditorium, a building, a stadium, and other suitable platforms. Platform cabin 205 may be an area in the platform in which seats may be present.

Figure 3:
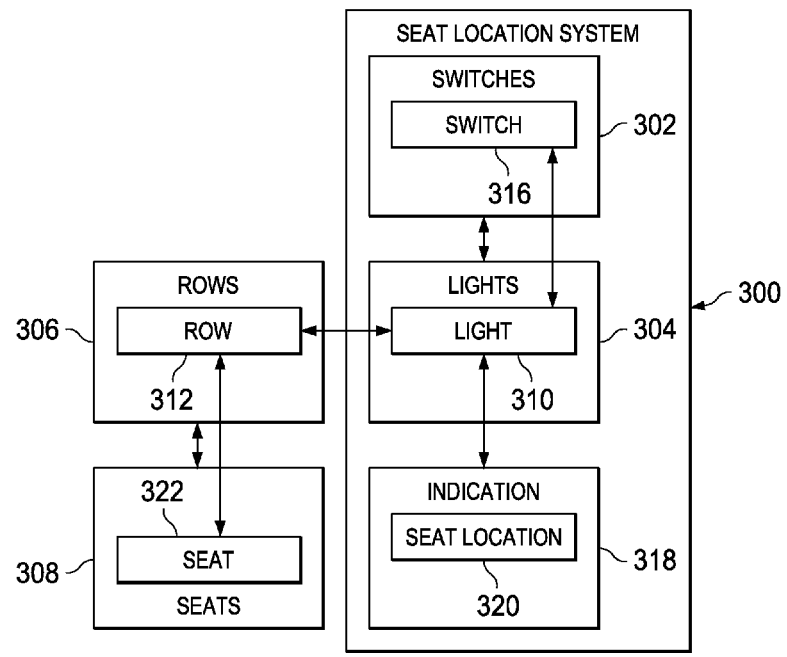
FIG. 3 is a more detailed illustration of a seat location system in the form of a block diagram in accordance with an illustrative embodiment.

With reference now to FIG. 3, a more detailed illustration of a seat location system is depicted in accordance with an illustrative embodiment. In this illustrative example, seat location system 300 is an example of one implementation for seat location system 200 in FIG. 2.

In this illustrative example, seat location system 300 comprises switches 302 and lights 304. Switches 302 are an example of components that may be used to implement controller 202 in FIG. 2. Lights 304 are an example of devices that may be used to implement indicators 204 in FIG. 2.

Switches 302 are electrically connected to lights 304. Lights 304 are associated with rows 306 of seats 308.

For example, light 310 in lights 304 is associated with row 312 in rows 306. In this illustrative example, light 310 may take a number of different forms. For example, light 310 may be an incandescent light, a light emitting diode, or some other suitable type of light generating device. In this illustrative example, light 310 is positioned relative to row 312 such that a passenger can find row 312 when light 310 is activated to generate light.

As depicted, switch 316 is configured to activate and deactivate light 310. Switch 316, in this illustrative example, is a physical switch that may be manipulated by a passenger in row 312. Thus, the passenger may activate light 310 when leaving row 312 of seats 308. In other words, light 310 may be activated by changing a position of switch 316. Light 310 is positioned to generate indication 318 of seat location 320 for seat 322 in row 312 for the passenger when light 310 is activated using switch 316. In this illustrative example, light 310 may also provide an indication for the location of other seats 308 in row 312 for other passengers.

Figure 4:
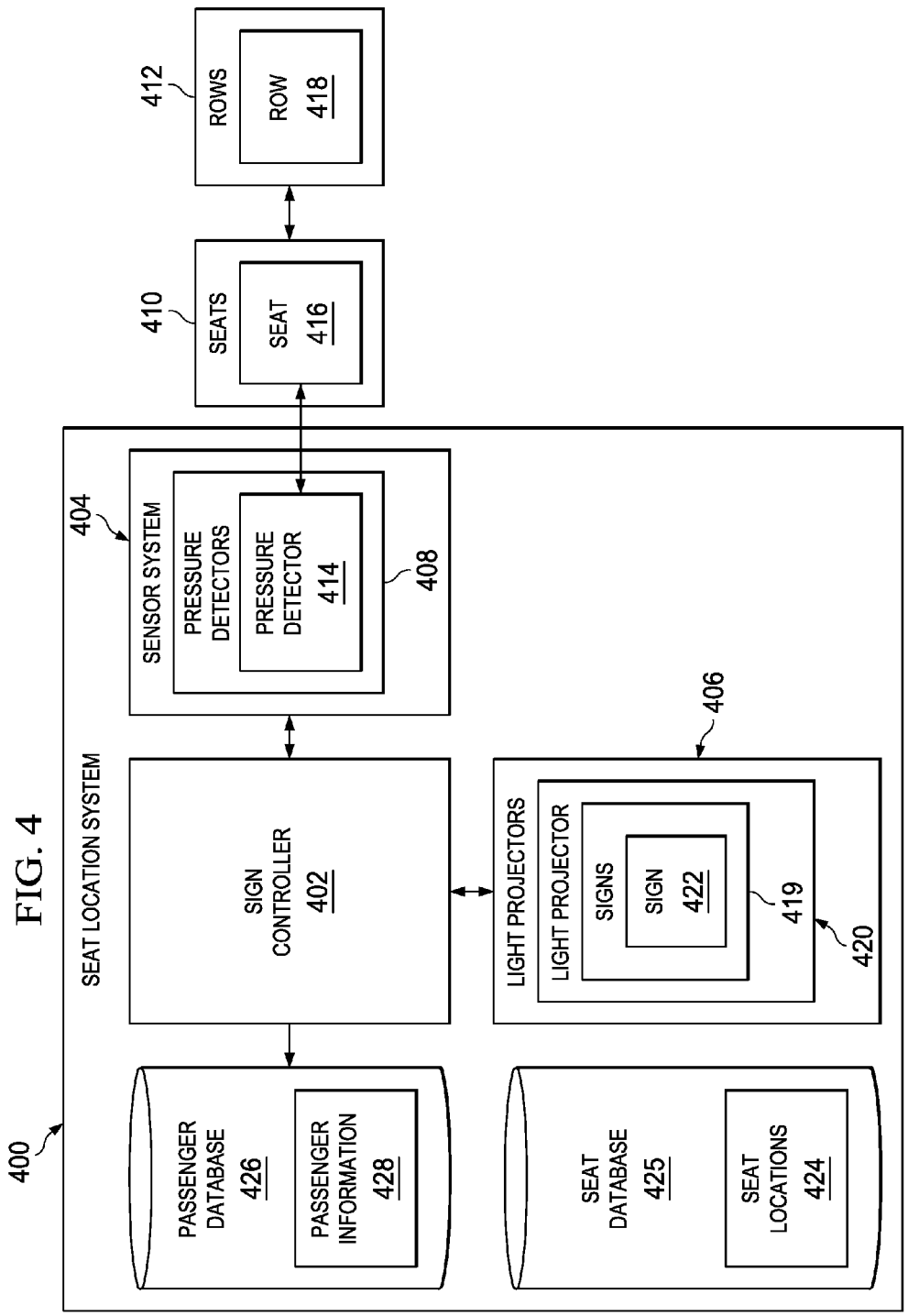
FIG. 4 is another illustration of a seat location in the form of a block diagram in accordance with an illustrative embodiment.

Turning now to FIG. 4, another illustration of a seat location system is depicted in accordance with an illustrative embodiment. In this illustrative example, seat location system 400 is an example of another implementation of seat location system 200 in FIG. 2.

As depicted, seat location system 400 includes sign controller 402 and sensor system 404. These components are examples of components that may be used to implement controller 202 in FIG. 2. Seat location system 400 also includes light projectors 406. Light projectors 406 are examples of components that may be used to implement indicators 204 in FIG. 2.

In this illustrative example, sign controller 402 may be implemented using one or more computers. When more than one computer is present, those computers may be in communication with each other over a communications medium such as a network. In this example, sign controller 402 is in communication with sensor system 404. Sensor system 404 is comprised of pressure detectors 408 in this particular example.

Pressure detectors 408 are associated with seats 410 which are arranged in rows 412. In the illustrative example, a pressure detector is associated with each seat. For example, pressure detector 414 is associated with seat 416 in seats 410 in row 418 in rows 412. In this manner, pressure detectors 408 may generate information that may be used to determine whether a passenger has left seat 416 in seats 410. This information is sent to sign controller 402.

Light projectors 406 may be associated with seats 410. In particular, light projectors 406 may be associated with rows 412 of seats 410. In some illustrative examples, light projectors 406 may not be associated with rows 412 of seats 410. Instead, light projectors 406 may be positioned elsewhere. Examples of other positions for light projectors 406 include at least one of on the floor, on a stowage bin, on a seat back, by an overhead light, or other suitable locations. The positioning selected may be such that signs 419 may be displayed by light projectors 406 in a manner that indicates particular rows in rows 412 of seats 410.

Sign controller 402 is configured to activate light projectors 406. Sign controller 402 may cause light projectors 406 to display signs 419. These signs are examples of indications of seat locations that may be generated by seat location system 400. Signs 419 may be unique identifiers for passengers assigned to seats 410.

In the illustrative example, light projector 420 in light projectors 406 is associated with row 418. In particular, sign controller 402 may cause light projector 420 to display sign 422 in signs 419. Sign 422 may be sent to light projector 420 from sign controller 402 or may be stored locally in light projector 420. When sign 422 is stored locally in light projector 420, sign 422 may be stored with other signs and may be selected by sign controller 402.

In this illustrative example, sign 422 may be displayed in different locations. For example, sign 422 may be displayed on at least one of an aisle by row 418, on the ceiling, or in some other suitable location.

Sign 422 may take various forms. In one illustrative example, sign 422 is a display generated by light projected from light projector 420. For example, sign 422 may be a colored light. For example, the color may be selected from any number of different colors such as red, blue, green, and other suitable colors and shades of colors for the colored light. Sign controller 402 is configured to control the colored light for sign 422. The colored light selected for sign 422 may be varied such that colors are not duplicated for other signs already displayed.

In another illustrative example, pressure detectors 408 may be mapped to seat locations 424 for seats 410 in seat database 425. In particular, an identification of rows 412 for seats 410 may be present in seat database 425. In this example, when pressure detector 414 indicates that a passenger has left seat 416, sign controller 402 may identify row 418 of seat 416 from an identification of pressure detector 414. The identification of pressure detector 414 may be from information sent from pressure detector 414, from the physical connection of pressure detector 414 to sign controller 402, or using some other suitable identification mechanism.

Sign controller 402 may cause light projector 420 to display a row number for row 418 as sign 422. Of course, in some illustrative examples, sign 422 may be stored in light projector 420. In this example, sign controller 402 does not need to send sign 422 to light projector 420. Instead, sign controller 402 may activate light projector 420.

In another illustrative example, sign controller 402 may display an image in addition to or in place of the colored light for sign 422. For example, sign controller 402 may access passenger database 426. Passenger database 426 contains passenger information 428 in this illustrative example. When pressure detector 414 indicates that a passenger has left seat 416, sign controller 402 may access passenger information 428 to identify the passenger assigned to seat 416. In this manner, sign controller 402 may generate sign 422 to be customized to the passenger assigned to seat 416. In particular, sign 422 may be a unique identifier for at least one of a passenger assigned to the seat or the seat itself. For example, sign 422 may be the name of the passenger. In another example, sign 422 may be any information designated by the passenger such as an animal, a city, a vacation location, or other suitable information that may be recognizable by the passenger. This information may be displayed using text, graphics, or some combination thereof to form sign 422.

The illustration of seat location system 300 in FIG. 3 and seat location system 400 in FIG. 4 are only meant as some illustrative examples of implementations for seat location system 200 shown in block form in FIG. 2. These illustrations are not meant to limit the manner in which seat location system 200 may be implemented. For example, sign controller 402 may take other forms other than a computer. For example, sign controller 402 may be logic controllers. These logic controllers are hardware circuits. Each pressure detector in pressure detectors 408 and light projector in light projectors 406 may be controlled by a logic controller.

In another illustrative example, other types of sensors may be used in sensor system 404 other than pressure detectors 408. For example, an active infrared detector may be used. An active infrared detector may project a beam across an opening in the row by an aisle. An interruption of the beam may be used to indicate whether a passenger has left a seat in the row.

As another illustrative example, the light projected by lights 304 in FIG. 3 and light projectors 406 in FIG. 4 may be projected onto other locations other than the floor of an aisle by a row of seats. For example, lights 304 may be located on top of the head rests of seats 308. In some illustrative examples, light projectors 406 may display signs 419 onto the ceiling of a passenger cabin.

In still another illustrative example, another type of indicator other than a light projector that projects light may be used. For example, signs 419 may be displayed using a device such as electronic paper, a display device, or some other suitable device.

Figure 5:
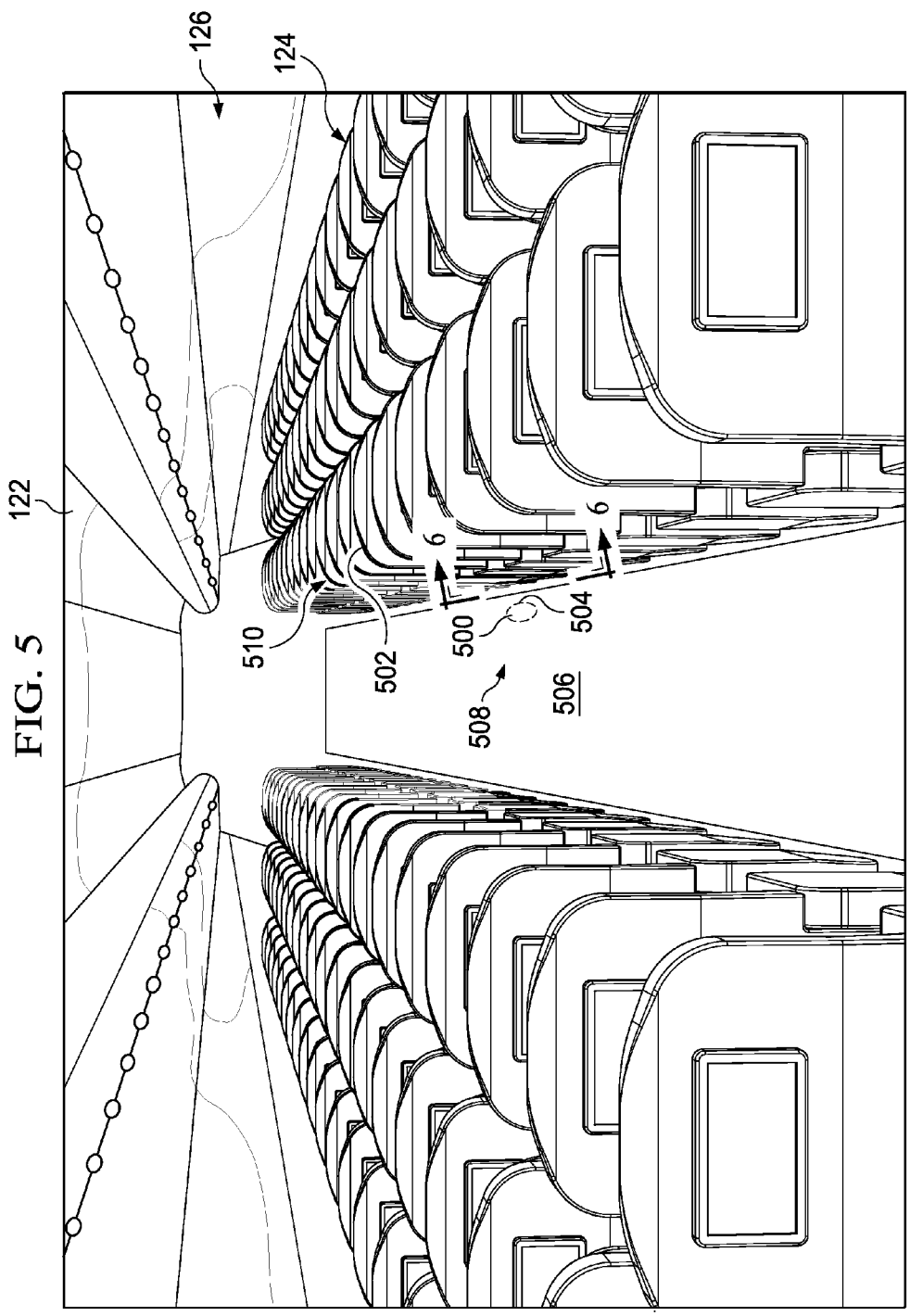
FIG. 5 is an illustration of a passenger cabin with a seat location system in accordance with an illustrative embodiment.

Turning now to FIG. 5, an illustration of a passenger cabin with a seat location system is depicted in accordance with an illustrative embodiment. As depicted, an illustration of passenger cabin 122 seen in the direction of lines 5-5 is shown in this figure.

In this illustrative example, the view of passenger cabin 122 is one that may be seen by a passenger returning to their seat from another location, such as a lavatory at the rear of aircraft 100. In this illustrative example, seat location system 126 includes indicator 500. As depicted indicator 500 is associated with row 502 of seats 124. As can be seen, indicator 500 takes the form of light 504. In particular, light 504 is associated with end 510 of row 502 of seats 124.

Light 504 illuminates floor 506 of aisle 508 in this particular example. As depicted, light 504 may be an incandescent bulb, a light emitting diode, or some other suitable source of light.

In this illustrative example, light 504 is activated and illuminates floor 506 of aisle 508 when a passenger leaves a seat in row 502. As can be seen, a passenger may more easily find and return to the seat in row 502 with the aid of light 504 in seat location system 126.

Figure 6:
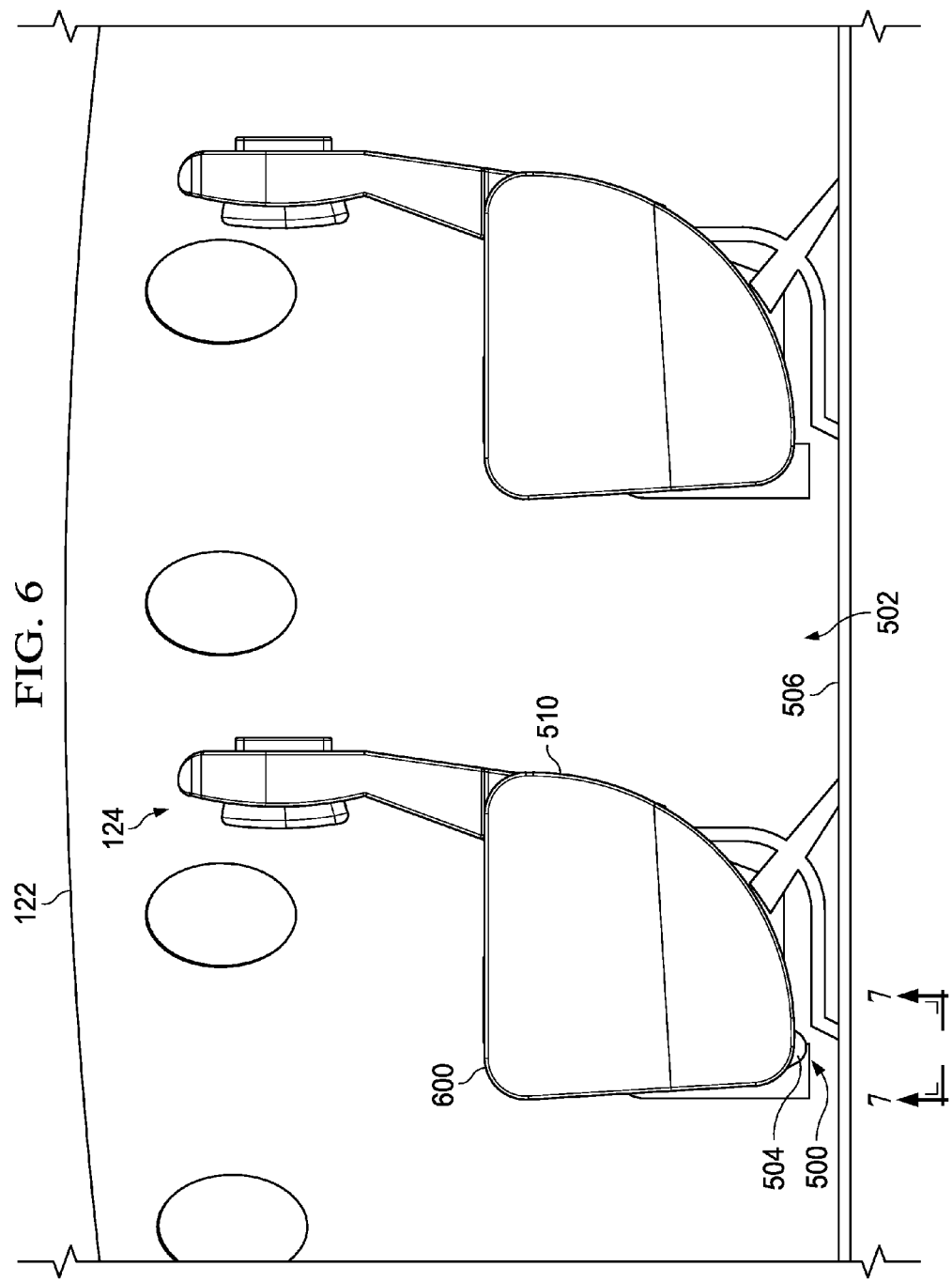
FIG. 6 is another illustration of a passenger cabin with a seat location system in accordance with an illustrative embodiment.

With reference now to FIG. 6, another illustration of a passenger cabin with a seat location system is depicted in accordance with an illustrative embodiment. In this illustrative example, a view of passenger cabin 122 is seen in the direction of lines 6-6 in FIG. 5. In this illustrative example, light 504 is shown as being associated with seat 600 in seats 124 in row 502.

Figure 7:
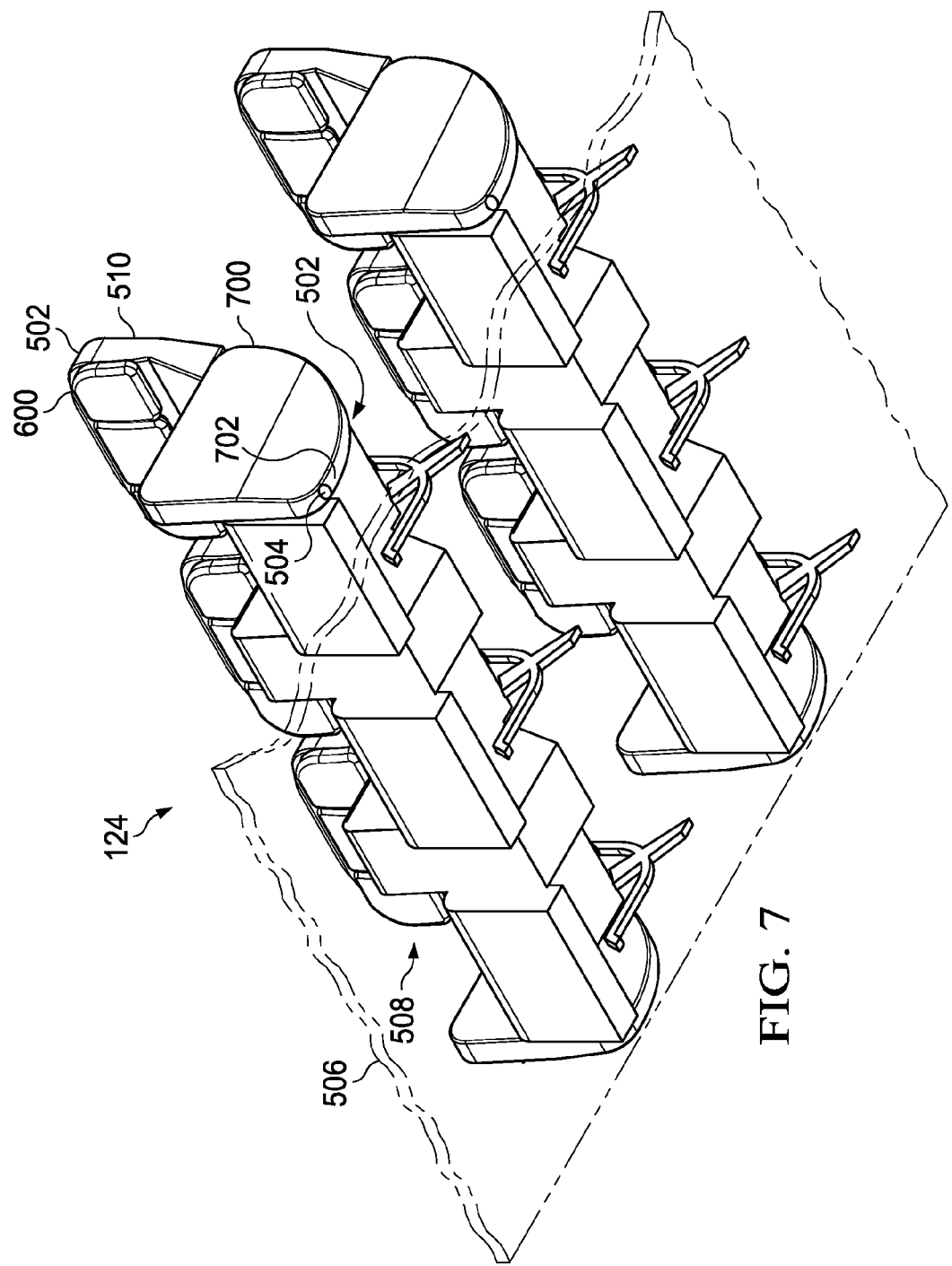
FIG. 7 is an illustration of another view of a passenger cabin with a seat location system in accordance with an illustrative embodiment.

Turning now to FIG. 7, an illustration of another view of a passenger cabin with a seat location system is depicted in accordance with an illustrative embodiment. In this illustrative example, a view of row 502 is seen in the direction of lines 7-7 in FIG. 6.

Floor 506 is shown in a transparent view. In this view, light 504 is shown as being associated with side 700 of seat 600. The location of light 504 is on bottom side 702 of seat 600. This positioning is configured to illuminate floor 506 of aisle 508 when light 504 is activated.

Figure 8:
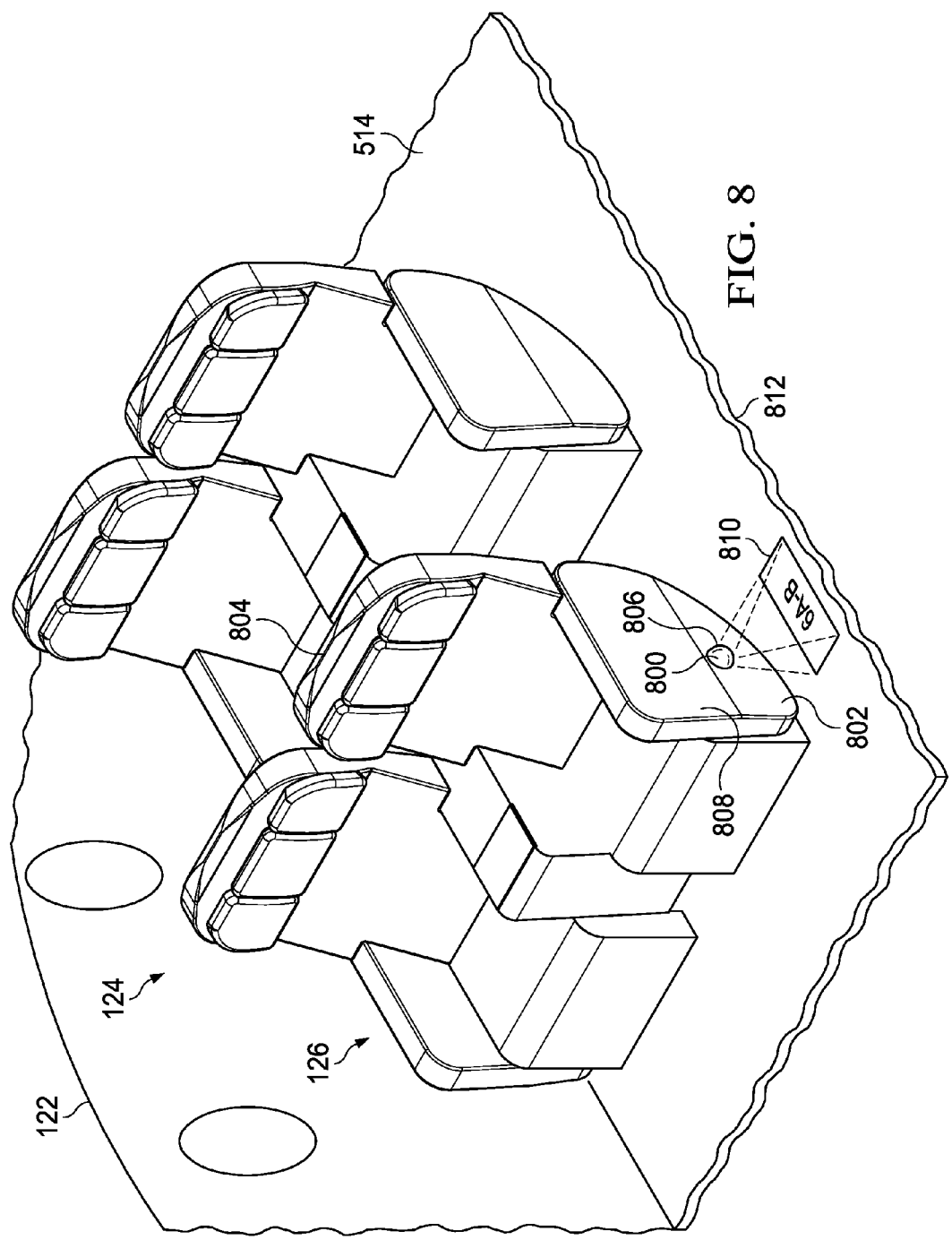
FIG. 8 is an illustration of another view of a passenger cabin with a seat location system in accordance with an illustrative embodiment.

With reference now to FIG. 8, an illustration of another view of a passenger cabin with a seat location system is depicted in accordance with an illustrative embodiment. In this illustrative example, a view of seats 124 in passenger cabin 122 is seen in the direction of lines 8-8 in FIG. 1.

In this illustrative example, indicator 800 in seat location system 126 is shown associated with seat 802 in row 804 of seats 124. As depicted, indicator 800 takes the form of light projector 806. Light projector 806 is associated with side 808 of seat 802. Light projector 806 is positioned to display sign 810 on floor 812 of aisle 814.

In this particular example, sign 810 is a display of a row number and seat identifiers for seats in row 804. The display of sign 810 may increase the ease at which a passenger may return to the same seat.

The illustration of indicator 800 as light 504 in FIG. 5 and indicator 800 as light projector 806 is not meant to limit the manner in which indicators may provide indications of seat locations for passengers. Other types of indicators may be used in addition to or in place of the ones illustrated in these illustrative examples.

For example, light 504 may be a group of light emitting diodes in which each light emitting diode provides illumination with a different colored light. The particular color may be selected by at least one of the passenger or a controller for the seat location system. In another illustrative example, sign 810 may have other text or graphics other than a row number and seat identifiers. For example, an image may be selected by at least one of the passenger or the seat location system. The image may include text, graphics, or other information. For example, the image may be an image of a car, an animal, or some other image. In yet other examples, sign 810 may include animation or other features that allow a passenger to distinguish sign 810 from other signs that may be displayed for other passengers who may have left other seats. In this manner, the indication of the seat may be different from another indication generated by another indicator in the passenger cabin.

Turning now to FIG. 9, an illustration of a flowchart of a process for indicating a seat location is depicted in accordance with an illustrative embodiment. The process illustrated in FIG. 9 may be implemented using seat location system 200 in FIG. 2.

The process begins by initializing a seat location system in the passenger cabin (operation 900). The initialization may include identifying which seats are occupied by passengers. For example, initialization may include receiving data from pressure sensors indicating which seats are occupied by passengers. This initialization may occur when the aircraft is on the runway, at takeoff, or some other time after passengers have been seated and prior to when passengers may leave their seats.

The process then activates an indicator for a seat in the passenger cabin when a passenger leaves the seat (operation 902). In operation 902, the process may detect when the passenger has left the seat. The indicator indicates a location of the seat when activated in this operation. In other words, the process activates the indicator for the seat in the passenger cabin when a detection of the passenger leaving the seat occurs. The process then deactivates the indicator when the passenger returns to the seat (operation 904), with the process then returning to operation 902 as described above. This process may continue until the seat location system is deactivated.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The illustrative embodiments of the disclosure may be described in the context of aircraft manufacturing and service method 1000 as shown in FIG. 10 and aircraft 1100 as shown in FIG. 11. Turning first to FIG. 10, an illustration of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. For example, a seat location system may be implemented during system integration 1008. In other illustrative examples, the seat location system in the different illustrative embodiments may be used during in service 1012 of aircraft 1100. Further, an illustrative embodiment also may be implemented in aircraft 1100 during refurbishment, upgrade, maintenance, and other operations in maintenance and service 1014.

Thus, the different illustrative embodiments provide a method and apparatus for indicating a seat location to a passenger. The indication of the seat location may be activated when a passenger leaves a seat. With the activation of the indicator, a passenger may more easily find and return to their seat. With the seat location system and one or more of the illustrative examples, a passenger may have a more pleasant flight experience with the reduction of the worries of being unable to quickly find their seat or sitting in an incorrect seat in the passenger cabin.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
an indicator in a passenger cabin such that the indicator displays, on at least one of: a floor, and a ceiling, of the passenger cabin, a unique identifier for a passenger assigned to a seat when the indicator is activated; and
a controller configured to activate the indicator.

2. The apparatus of claim 1, wherein the controller activates the indicator when the passenger leaves the seat.

3. The apparatus of claim 1, wherein the indicator is associated with at least one of the seat or a row of seats.

4. The apparatus of claim 1, wherein the unique identifier comprises at least one of a row number, a light, a colored light, a name, an animal, a city, or a vacation location.

5. The apparatus of claim 1, wherein the indicator is associated with the seat.

6. The apparatus of claim 1, wherein the indication of the seat is different from another indication generated by another indicator in the passenger cabin.

7. The apparatus of claim 1, wherein the indicator is selected from at least one of an incandescent light, a light emitting diode, a light projector, a display screen, a digital sign, electronic paper, or electronic ink.

8. The apparatus of claim 1, wherein the controller is selected from at least one of a switch or a pressure sensor associated with the seat.

9. The apparatus of claim 1, wherein the passenger cabin is located in a vehicle selected from one of an aircraft, a surface ship, a spacecraft, a train, or a bus.

10. A seat location system comprising:
rows of seats in a platform cabin; and
indicators associated with the rows of the seats, such that an indicator in the indicators projects a unique identifier for a passenger assigned to a seat in a row of the rows of the seats within the platform cabin, onto at least one of: a floor, and a ceiling, of the platform cabin, when activated by the passenger leaving the seat.

11. The seat location system of claim 10, wherein the unique identifier comprises at least one of a row number, a light, a colored light, a name, an animal, a city, or a vacation location.

12. The seat location system of claim 10, wherein the seat location system is located in a platform selected from one of an aircraft, a surface ship, a spacecraft, a train, a bus, a mobile platform, a stationary platform, a land-based structure, an aquatic-based structure, a space-based structure, a movie theater, an auditorium, a stadium, and a building.

13. A method for indicating a seat location, the method comprising:
- activating an indicator for a seat in a passenger cabin when a passenger leaves the seat, such that the indicator indicates, on at least one of: a floor, and a ceiling, of the passenger cabin, a unique identifier for the passenger assigned to the seat when activated.

14. The method of claim 13, wherein the activating step comprises:
- detecting when the passenger leaves the seat; and
- activating the indicator for the seat in the passenger cabin when a detection of the passenger leaving the seat occurs.

15. The method of claim 13, wherein the activating step comprises:
- changing a position of a switch.

16. The method of claim 13, wherein the indicator at least one of: emits a light or a colored light, or projects a sign.

* * * * *